Jan. 13, 1931.     H. DOCK     1,788,566

PISTON

Filed Dec. 26, 1929

INVENTOR
Herman Dock
BY
Gustav Drews
ATTORNEY

Patented Jan. 13, 1931

1,788,566

UNITED STATES PATENT OFFICE

HERMAN DOCK, OF GUADALAJARA, MEXICO

PISTON

Application filed December 26, 1929. Serial No. 416,398.

My invention relates to pistons, and especially to a new and improved piston, rod and bearing construction or arrangement which replaces the pin-and-sleeve bearing commonly used in trunk or other pistons, and eliminates the various disadvantages of such wrist bearings, as understood by skilled persons.

The invention consists in an improved and simplified part-spherical bearing connecting a piston and rod or pitman, providing in comparison with the ordinary wrist pin bearing, greatly increased bearing surface, greater strength and practical immunity from breakage, automatic accommodation to slight misalignment of piston, or cylinder and crank shaft, improved facility for lubrication, and various other advantages sufficiently referred to hereafter.
Particularly, the invention provides an improved and simplified lower piston bearing (or a rod-bearing retaining member) composed of two parts for assembly purposes and combining in itself bearing, adjustment and locking functions, and thus dispensing with a separate or additional locking ring or analogous device such as has heretofore been necessary in piston and rod connections of this general type, in addition to an annularly continuous, or two-part lower bearing member.

The lower bearing or retaining member for the rod plate or bearing includes in addition to its two main semi-annular members, means at one side for registering or retaining the two bearing members together, and means at the other side for registering and for spreading the members for locking, after adjustment; and the semi-annular members are also externally threaded to engage an internal thread in the piston.

The characteristics and advantages of the invention are further sufficiently explained in connection with the following detailed description of the accompanying drawings, which show representative embodiments. After considering these examples, skilled persons will understand that many variations may be made without departing from the principles disclosed; and I contemplate the employment of any structures that are properly within the scope of the appended claims.

Figure 1:
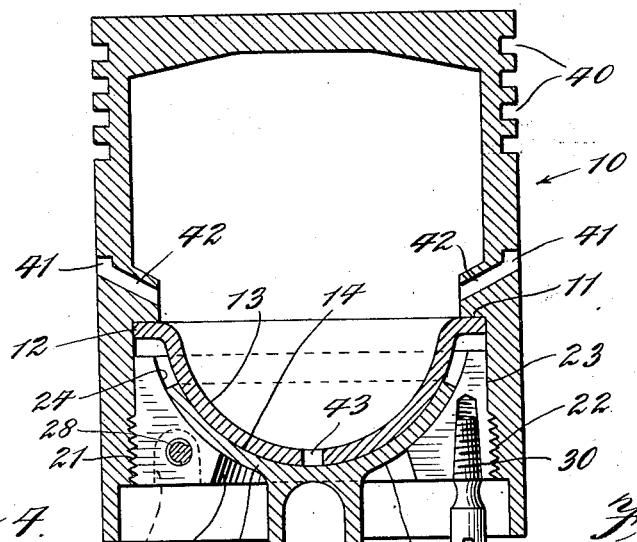
Fig. 1 is a vertical section of a piston, rod and bearing embodying the invention in one form.

The invention is applicable to pistons of various types, but is especially advantageous in trunk pistons as used in internal combustion engines, and is therefore here shown in conjunction with a trunk piston 10, which may be of any known or suitable construction, except for features related to the invention, as herein fully explained.

At any suitable axial position the cylindrical wall of the piston has an internal shoulder 11 receiving the flange 12 of a substantially semi-spherical bearing plate or member 13, which is conveniently identified as the upper piston bearing. The bearing plate is of moderately thick section and the lower face of the portion 13 provides a semi-spherical bearing surface 14.

Figure 2:
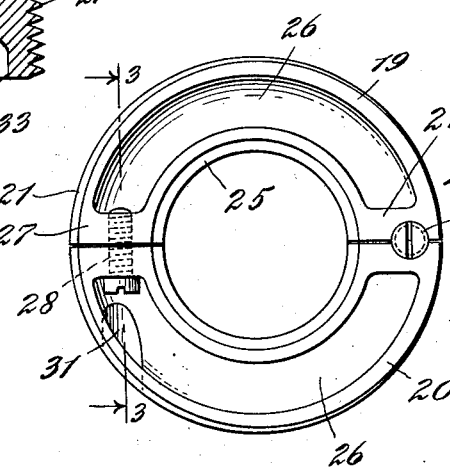
Fig. 2 is a bottom plan of the lower or retaining bearing.

The rod or pitman 15 has at its upper end a (usually integral) part-spherical bearing plate 16, the upper, concave surface of which has bearing contact with the surface 14. The lower, concentric surface 17 of the rod bearing plate has bearing contact with the lower piston bearing 18 (Fig. 2). This combined bearing, retaining and adjusting member consists of two semi-annular segments 19 and 20, combining to form in an operative sense a practically unitary annular lower piston bearing. The lower peripheral parts of the two members are provided with a screw-thread 21, to engage an internal thread 22 in the piston skirt. The upper peripheral portions of the two bearing members may be smooth and cylindrical, engaging with the inner skirt surface

23 to provide ample stabilizing contact between the bearing members and piston. The upper and inner surfaces 24 of the segments 19, 20 are semi-spherical to cooperate with the surface 17 of the rod bearing plate. At the bottom, the segments are formed to provide a circular or flaring aperture 25 to receive the rod 15 and provide sufficient clearance for the rod swing. The underfaces of the segments 19, 20 may be recessed as at 26, these recesses terminating in end walls 27, the end walls of the two segments substantially abutting.

At one side, the segments are held in registered relation, or secured together, by suitable means such as a pin, or, as shown, preferably in some cases by a screw 28. The screw passes through a bore in an end wall 27 of one segment and engages in a threaded hole 29 in the corresponding wall of the other segment to retain the segments together at one side with sufficient firmness to allow easy assembly and adjustment. When once assembled and located in the piston, the segments are held in proper position without entire or principal dependence upon the screw or equivalent connecting device.

At the opposite side, the two abutting segment ends or end walls 27 are mutually taper-bored and threaded to receive a taper screw 30.

In assembling, the segments 19 and 20 are connected at one side as by screw 28, and at the other side the tapered screw 30 is loosely inserted; the complete lower bearing is then inserted in the piston and its screw-thread engaged with the skirt thread 22, and the bearing is screwed up to secure the desired bearing adjustment and is then locked by tightening the tapered screw 30, (or equivalent means) by which the segments are spread slightly and firmly located in the piston; and thereafter the bearing adjustment is secure and is maintained for practically indefinite time, since wear and other difficulties attendant on pin and sleeve bearings are practically eliminated.

Figure 3:
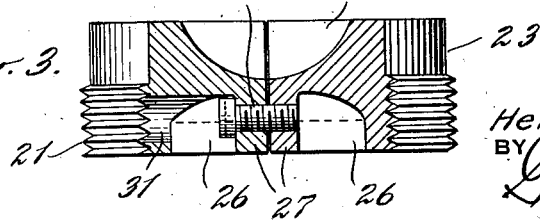
Fig. 3 is a section at 3—3, Fig. 2.

In Figs. 1, 2 and 3, the registering or holding screw 28 is located in a cross-axial plane, and one of the lower-bearing segments such as 20 is provided with a channel, or a hole 31 passing through its outer wall and into recess 26, this hole being aligned with the screw holes in walls 27 and large enough to admit the screw and screw head and also to admit a screw driver by which the screw is tightened.

Figure 4:
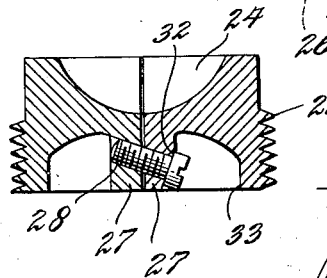
Fig. 4 is a similar fragmentary section showing a slightly modified registering or connecting device for the semi-annular bearing members.

In Fig. 4, such a hole or channel as 31 is dispensed with, and the axis of screw 28 and the screw holes is diagonal; that is, in a plane at a diagonal angle to the piston axis. One of the segment walls 27 is bevelled as at 32, forming a face at proper angle to receive the screw head; the distance from this face 32 to the opposite wall surface 33 is slightly greater than the length of the screw, permitting easy insertion of the screw; and the screw angle is also such that a screw driver may be easily applied to tighten it.

Figure 5:
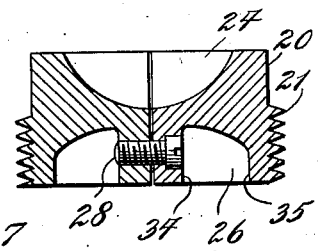
Fig. 5 is a similar section showing another modification.

In Fig. 5, the screw arrangement or location is similar to that of Fig. 3 and no hole or aperture such as 31 is provided in the bearing segment 20. In such cases, the screw may be of such length that it can be inserted into the screw holes; that is the screw is slightly shorter than the distance between wall surfaces 34 and 35, and the screw may be tightened by a driver having an angle-bit.

By the described construction or arrangement, the bearing and bearing connections are reduced to probably maximum simplicity. Especially, no continuous or two-part retaining or locking ring is required in addition to the bearing segments 19, 20, as in previous structures of this general type. The lower bearing is made in two segments since it is not practicable to make the central opening 25 large enough to pass over the sleeve bearing structure at the lower end of the connecting rod, or over the bearing plate 16 at the upper end of the rod, when that plate is of proper diameter, and of circular form, to provide the desired ample bearing areas. There is therefore no necessity to reduce the diameter of the rod bearing plate 16, or to make it of non-circular or other irregular contour, for assembly purposes.

It will be evident that in some cases the various bearing members may be inverted, in the sense that the upper piston bearing 13 may be turned upward instead of down, making its active bearing surface concave instead of convex, and the other bearing members will then be correspondingly reformed or rearranged. This will bring the bearing as a whole to a higher position in the piston or nearer the head 10, which is desirable and practicable in some cases, especially if the piston-stroke is short.

The piston may have any desired ring groove arrangement, as at 40. Desirably, an annular oil-groove is provided such as 41, located somewhat above the periphery of the upper bearing 13, and one or more channels 42 are cut angularly downward from the oil-groove to conduct oil from the cylinder wall to the interior of the upper bearing plate, which has at its center an oil hole 43 by which oil is supplied to the engaging surfaces of the upper bearing and the rod bearing plate; and this oil will work around the periphery of the rod plates and lubricate the engaging surfaces of that plate and of the lower bearing, regardless of any splash oiling. Unusually ample and uneffective lubrication is therefore provided in a simple way, although the bearing will run almost indefinitely with negligible wear when provided with little or no lubricant, or much less than is necessary in a bearing of the pin type.

It is unnecessary to secure the upper bearing 13 in the piston except by the retention afforded by the insertion, adjustment and locking of the lower bearing, as above described. This upper bearing may be of any suitable material and may be cast or forged, or in some cases may be of pressed metal. The lower bearing segments may also be of any suitable metal or alloy.

I claim:

1. A piston, rod and bearing structure comprising a piston, an upper part-spherical bearing therein, a rod having a part-spherical bearing plate, and a lower piston bearing in segments forming an annulus having peripheral threads engaging a thread in the piston, and also having means acting to expand the annulus and lock the lower bearing in the piston.

2. A piston, rod and bearing structure comprising a piston, an upper part-spherical bearing therein, a rod having a part-spherical bearing plate, and a lower piston bearing in segments forming an annulus having peripheral threads engaging a thread in the piston, and also having means acting to expand the annulus and lock the lower bearing in the piston, the lower bearing having an upper part-spherical bearing surface cooperating with the rod bearing plate.

3. A piston, rod and bearing structure comprising a piston, an upper part-spherical bearing therein, a rod having a part-spherical bearing plate, an annular lower piston bearing having a part-spherical surface engaging the rod bearing plate and composed of segments, means retaining the segments in registry at one point, and at another point, means for spreading the segments to lock the lower bearing in the piston.

4. A piston, rod and bearing structure comprising a piston, an upper part-spherical bearing therein, a rod having a part-spherical bearing plate, an annular lower piston bearing having a part-spherical surface engaging the rod bearing plate and composed of segments, means retaining the segments in registry at one point, and at another point, means for spreading the segments to lock the lower bearing in the piston, the lower bearing having a peripheral thread engaging an internal piston thread.

5. A piston, rod and bearing structure comprising a piston, an upper part-spherical bearing therein, a rod having a part-spherical bearing plate, an annular lower piston bearing having a part-spherical surface engaging the rod bearing plate and composed of segments, means retaining the segments in registry at one point, and at another point, means for spreading the segments to lock the lower bearing in the piston, the lower bearing having a peripheral thread engaging an internal piston thread, and above the thread having a cylindrical portion to engage an inner cylindrical piston surface.

6. A piston, rod and bearing structure comprising a piston, an upper part-spherical bearing therein, a rod having a part-spherical bearing plate, an annular lower piston bearing having a part-spherical surface engaging the rod bearing plate and composed of segments, the segments being connected at one side, and means at the other side of the segments for relatively expanding them to lock the lower bearing in position.

7. A piston, rod and bearing structure comprising a piston, an upper part-spherical bearing therein, a rod having a part-spherical bearing plate, an annular lower piston bearing having a part-spherical surface engaging the rod bearing plate and composed of segments, the segments being connected at one side, and at the other side of the annulus a tapered screw engaging a threaded tapered bore formed mutually in the segments to spread them and lock the lower bearing in position.

8. A piston, rod and bearing structure comprising a piston, an upper part-spherical bearing therein, a rod having a part-spherical bearing plate, an annular lower piston bearing having a part-spherical surface engaging the rod bearing plate and composed of segments, a screw connecting the segments at one side of the bearing annulus, and means at the other side of the annulus for spreading the segments to lock the bearing in position.

9. A piston, rod and bearing structure comprising a piston, an upper part-spherical bearing therein, a rod having a part-spherical bearing plate, an annular lower piston bearing having a part-spherical surface engaging the rod bearing plate and composed of segments, a screw connecting the segments at one side of the bearing annulus, one of the segments having an aperture admitting insertion of the screw, and means at the other side of the annulus for spreading the segments to lock the bearing in position.

10. A piston, rod and bearing structure comprising a piston, an upper part-spherical bearing therein, a rod having a part-spherical bearing plate, an annular lower piston bearing having a part-spherical surface engaging the rod bearing plate and composed of segments, a screw connecting the segments at one side of the bearing annulus, one of the segments having an aperture admitting insertion of the screw and affording access for a tool to tighten it, and means at the other side of the annulus for spreading the segments to lock the bearing in position.

11. A piston, rod and bearing structure comprising a piston, an upper part-spherical bearing therein, a rod having a part-spherical bearing plate, an annular lower piston bearing having a part-spherical surface engaging the rod bearing plate and composed of segments, a screw connecting the segments at one side of the bearing annulus, and at the other side of the annulus a tapered screw engaging a threaded tapered bore formed mutually in the segments to spread them and lock the lower bearing in position.

12. A piston, rod and bearing structure comprising a piston, an upper part-spherical bearing therein, a rod having a part-spherical bearing plate, a lower piston bearing in segments combined to form an annulus having peripheral threads engaging a thread in the piston, and means acting to expand the bearing segments and lock the lower bearing in the piston, the lower bearing having an upper part-spherical bearing surface cooperating with the rod bearing plate.

HERMAN DOCK.